3,213,727
METHOD OF MAKING CORE PIECES
Donald O. Schwennesen, Marengo, Ill., assignor to Allegheny Ludlum Steel Corporation, Brackenridge, Pa., a corporation of Pennsylvania
Filed Oct. 25, 1963, Ser. No. 319,008
5 Claims. (Cl. 83—32)

This invention relates to a method of making core pieces or laminations for electrical apparatus from a continuous strip of metal.

Certain forms of electrical apparatus, such as transformers and the like, utilize core members made from stacked laminations assembled from different sized E-shaped pieces or bodies, which, when assembled with the legs of opposed E-shaped bodies abutting one another and stacked so as to provide staggered joints between adjacent laminations or groups of laminations, consist of parallel bases with three parallel legs to form parallel slots to receive the core windings. Usually the center leg of such E-shaped bodies is provided with a width that is twice the width of the outer legs with the result that in the past where it has been desired to cut only E-shaped bodies from narrow strips of suitable metal, considerable scrap has been generated.

An object of this invention is to provide a method of forming or cutting an equal number of two pairs of E-shaped laminations, core pieces or bodies from a continuous strip, the pairs differing only in the length of the legs of the E-shaped bodies, with a minimum waste of strip material.

Another object of this invention is to provide a method of progressively cutting a strip within a given area to provide two pairs of E-shaped bodies differing only in the length of the legs thereof with a minimum waste of strip material.

Other objects of this invention will become apparent from the following description when taken in conjunction with the accompanying drawing in which.

Figure 1:
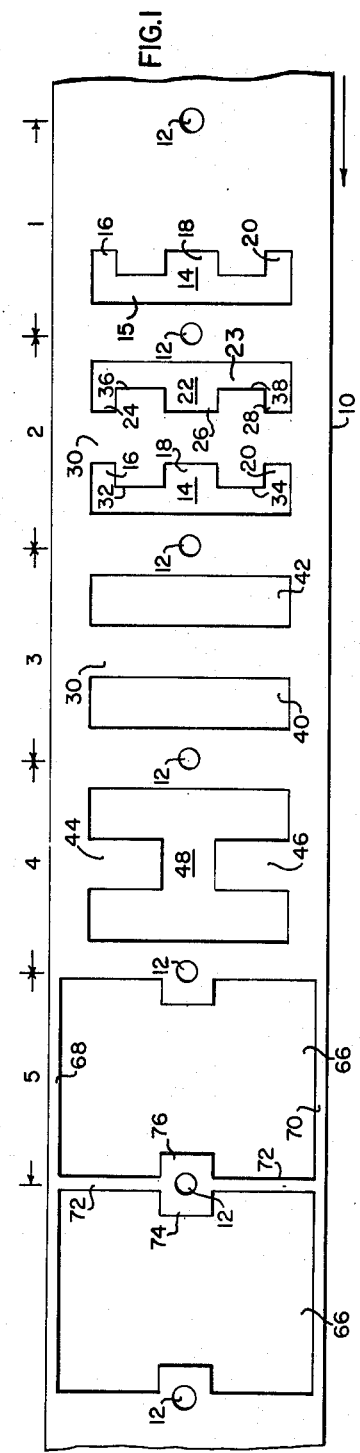
FIGURE 1 is a plan view of a strip of metal illustrating several steps involved in the method of this invention.

Referring to the drawings and in particular to FIG. 1 thereof, this invention is illustrated as applied to a strip 10 of suitable metal disposed to be progressively advanced through the different stations of a progressive die (not shown). Progressive dies are well known and need not be shown or described as it will be understood that such dies may have different constructions so long as the punch block, punches and corresponding openings in the die are positioned in the different stations to provide the required cutting operations. In the preferred embodiment of this invention, a progressive die having five different cutting or punching stations is utilized although, as will be referred to hereinafter, a progressive die having a less number of cutting stations may be used where it is found feasible to do so without introducing too much strain while obtaining clean cut edges of the E-shaped laminations or where the cost of providing a die capable of performing the multiple cutting operations in a given station is not prohibitive.

In the practice of this invention, guide openings 12 are cut in the strip 10 centrally of the strip and spaced a predetermined distance so that the distance therebetween equals the distance allotted for each station in the progressive die. The openings 12 may be formed externally of the progressive die prior to admission of the strip to the die or preferably in the first cutting station of the progressive die. Such openings 12 are thereafter utilized in cooperation with suitable retractable pins (not shown) in the die to properly and accurately position the strip 10 in the different progressive cutting stations of the progressive die.

Assuming that the spaced openings 12 are cut in the strip 10 centrally of the width thereof as the strip is admitted to the die and with the strip being admitted to the die for movement in the direction shown by the arrow, the first opening 12 is punched or cut into the leading end of the strip whereupon the strip 10 is then advanced to a position where such cut opening 12 is positioned at the second opening 12 shown with the strip being held in such position by a suitable pin as referred to hereinbefore. The progressive die is then operated to cut from such strip at the first station, an E-shaped member 14 having a base 15 of predetermined length that extends crosswise of the strip and three legs 16, 18 and 20 which extend lengthwise of the strip, it being noted that such legs are of equal predetermined length and that the outer legs 16 and 20 have a predetermined width equal to the width of the base 15 and one-half the width of the center leg 18. The upper and lower edges of the E-shaped member or body terminate a distance from the outer edges of the strip 10 equal to about one and a half times the width of the base 15 and of the legs 16 and 20. Simultaneously with the cutting of the E-shaped member or body 14 from the strip 10, another opening 12 is punched from the strip in the first position so that two openings 12 now appear in the strip. The spaced openings 12 are separated by a distance which is equal in distance to each of the cutting stations in the progressive die, such cutting stations and length thereof being designated by the numerals 1, 2, 3, 4 and 5 shown above the strip 10 in FIGS. 1 and 2.

Upon completion of the cutting of the small E-shaped member 14, the designation "small" being applied because of the length of the legs 16, 18 and 20 thereof, the strip 10 is advanced to be positioned in station 2 of the die wherein the spaced openings 12 properly position the strip relative to the die. At station 2, a second small E-shaped member 22 that is complementary to the first small E-shaped member 14 but positioned in an opposed relation thereto is cut from the strip 10. As in the first instance, the E-shaped member 22 is cut with its base 23 extending crosswise of the strip and legs 24, 26 and 28 extending lengthwise of the strip in a direction towards and aligned with the legs of the blank opening left by the cutting of the first small E-shaped member 14. The outer extremities of the legs 24, 26 and 28 of the E-shaped member 22 terminate a predetermined distance in the strip from the outer extremities of the legs 16, 18 and 20, respectively, of the E-shaped member 14 so as to leave a section 30 of strip therebetween extending crosswise of the strip, such section 30 having a width equal to the width of the center legs 18 and 26 and having a pair of spaced extensions 32–34 and 36–38 on the opposite sides thereof extending lengthwise of the strip and corresponding to the spaces between the respective legs of the respective E-shaped members 14 and 22. It is to be noted that as the second small E-shaped member 22 is cut from the strip 10, another first small E-shaped member 14 as well as another opening 12 is punched from the strip at station 1 of the cutting die.

Thereupon the strip 10 is advanced so as to be positioned between spaced openings 12 in station 3, at which station suitable dies cut the extensions 32–34 and 36–38 from the opposite sides of the section 30 (see also station 3 of FIG. 2) to leave two rectangular blank openings 40 and 42, respectively, extending across the strip 10 separated by the section 30 having a uniform width throughout its length. It is to be noted that in stations 1, 2 and 3 all of the cutting operations leave a longitudinally extending narrow portion of the strip along the opposite outer edges of the strip 10 which has a width in excess of (about one and a half times) the width of the bases 15 and 23 of the small E-shaped members 14 and 22 that are cut from the strip, the purpose of such width being more clearly explained and illustrated hereinafter. At the same time that the rectangular blank openings 40 and 42 are formed in the strip at station 3, the operations explained hereinbefore with respect to stations 1 and 2 are repeated for forming another pair of the small E-shaped members 14 and 22.

Having formed the rectangular blank openings 40 and 42 in the strip 10, the strip is advanced to station 4 in the die at which position suitable dies effect a cutting of the section 30 between the blank openings 40 and 42 so as to remove a predetermined centrally positioned square portion therefrom (see square portion 43 illustrated at station 4 of FIG. 2) so as to leave two extensions 44 and 46 extending crosswise of the strip 10 from the longitudinally extending portions of the strip along the edges thereof and in effect leaving an H-shaped opening 48 in the strip 10, it being noted that the legs and connecting portions of the H-shaped opening 48 each have a width equal to the width of the center legs 18 and 26 of the E-shaped members 14 and 22 and of the extensions 44 and 46, such extensions 44 and 46 having a length equal to twice the length of the center legs 18 and 26 of the E-shaped members 14 and 22. As will be understood, the operations described hereinbefore with respect to stations 1, 2 and 3 are performed simultaneously with the formation of the H-shaped opening 48 in the strip. Thereafter, the strip is again advanced to station 5 in the die, the openings 12 being effective for properly positioning the strip 10 in such die.

In station 5 of the die, a pair of larger E-shaped members or laminations 50 and 52 (see FIG. 2) are simultaneously cut from the strip 10, such E-shaped members being punched or formed from the material adjacent to and which forms the outline of the outer extremities of the H-shaped opening 48, it being noted that the bases 54 and 56 of the respective E-shaped members or bodies 50 and 52 extend lengthwise of the strip 10 a distance equal to the length of the bases 15 and 23 of the small E-shaped members 14 and 22, such bases 54 and 56 also having a width equal to the width of the bases of the E-shaped members 14 and 22. It is also to be noted that the outer legs 58 and 60 of the E-shaped member 50 have a width corresponding to the width of the outer legs 16–20 and 24–28 of the small E-shaped members 14 and 22, respectively, but have a length equal to twice the length thereof and equal to the length of the center legs 44 and 46 comprising the extensions identified by the same numbers, such legs extending crosswise of the strip 10. It is also to be noted that the E-shaped member 52 is formed simultaneously with the E-shaped member 50 and is complementary thereto but disposed in opposed relation with its legs 46, 62 and 64 extending crosswise of the strip and being of the same width and length as and in alignment with the legs 44–58–60 of the E-shaped member 50. The cutting of the E-shaped members 50 and 52 and the formation of the legs thereof are better illustrated by the dash outline shown in station 5 of FIG. 2. Such cutting operation leaves a substantially rectangular blank opening 66 as illustrated in FIG. 1, such blank opening being spaced from the outer edges of the strip 10 by connecting strips 68 and 70 along the opposite edges of the strip 10. As additional substantially rectangular blank openings 66 are formed, a connecting strip 72 extending crosswise of the strip is formed between adjacent blank openings 66 corresponding in width to the connecting strips 68 and 70 and having small extensions 74 and 76 on opposite sides thereof adjacent the opening 12 corresponding to the small amount of strip material remaining about the opening 12 when substantially rectangular blank opening 66 is formed therein. It will be appreciated that as the E-shaped members 50 and 52 are cut from the strip, simultaneous cutting operations are being performed in stations 1, 2, 3 and 4 of the die so that as the strip is progressively advanced through the die a pair of the small E-shaped laminations 14 and 22 and a pair of the large E-shaped laminations 50 and 52 are simultaneously formed for a given operation of the die.

Figure 2:
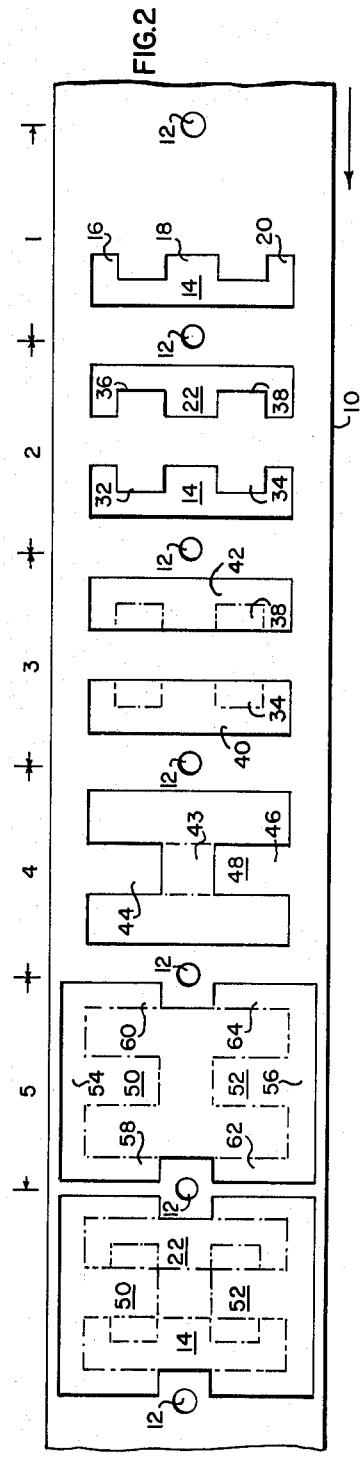
FIG. 2 is a plan view similar to FIG. 1 but having superimposed on certain of the resulting blank openings in dash outline the pieces progressively cut therefrom during the practice of the invention.

Referring to FIG. 2, there is superimposed upon the substantially rectangular opening 66 appearing at the extreme left of the strip and adjacent station 5, each of the pieces in dashed outline that have been cut from the strip from the given area of the substantially rectangular blank opening 66 during the five-step operation in the die. Only the two pairs of the E-shaped members 14–22 and 50–52 are identified by numbers thereon so as to clearly illustrate the positioning of such E-shaped members, the other unnumbered portions illustrated in dash outline, such as extensions 32–34 and 36–38 and the centrally disposed square portion 43, being illustrated and identified in connection with the blank openings formed in the strip 10 at stations 3 and 4.

As will be apparent, the formation of the two different sized pairs of E-shaped members 14–22 and 50–52 has been described with respect to a five-station progressive die. However, it will be appreciated that the pair of small E-shaped members 14 and 22 can be simultaneously formed at a single station along with the first opening 12 where the die design and construction are compacted to eliminate a cutting station and where such simultaneous cutting of the small E-shaped members will not introduce undue strain in the resulting E-shaped members. Likewise, the cutting operations performed in stations 3 and 4 can also be effected in a single cutting station where the simultaneous cutting of the extensions 32–34 and 36–38 and of the square central portion 43 will not introduce undue strains in the resulting extensions 42 and 46 shown in station 4 and comprising a portion of the H-shaped opening. Thus, instead of a five-station progressive die, either a four-station or a three-station progressive die may be utilized depending upon the complexity of the die, the type of metal from which the strip is formed, the cleanliness of the cutting operation and the strains introduced into the resulting E-shaped members. The five-station operation described is preferred in practice as suitable dies can and have been constructed and used in the practice of this invention to produce E-shaped members as described and which have clean-cut edges and which are free from undue strains therein.

Figure 3:
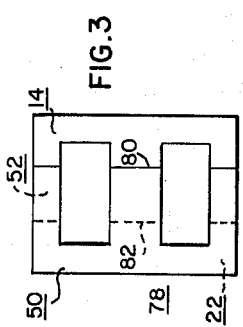
FIG. 3 is a plan view of a core member formed from the two different sized E-shaped pieces produced in accordance with this invention.

Referring to FIG. 3, there is illustrated a stacked core member 78 formed from the E-shaped members produced in accordance with this invention. As illustrated, each of the lamination layers of the core member 78 is formed from one of the large E-shaped members 50 and one of the small E-shaped members 14 with adjacent laminations or groups of laminations being formed of the other large E-shaped member 52 and the other small E-shaped member 22, such alternate layers of laminations or groups of laminations being alternately stacked so as to provide staggered joints 80 and 82, respectively. The core member 78 formed from the laminations produced in accordance with this invention is a very efficient structure which when provided with windings (not shown) produces an efficient transformer or the like.

By forming the E-shaped members in the manner described, very little scrap material is produced and a considerable saving is effected in the formation of such E-shaped members. The method described effects a saving of 0.34 pound of strip per pound of E-shaped members formed from 0.006″ thick strip over the known methods previously utilized for producing only E-shaped members. As will be appreciated, such method may be practiced with different dies with a minimum of scrap as long as the E-shaped members are produced in the manner described from the given area defined by the substantially rectangular openings 66 formed in the strip.

I claim:

1. The method of preparing transformer core pieces from a continuous strip which comprises the steps of, cutting a first pair of opposed complementary E-shaped bodies of predetermined size having a base and spaced legs of equal length extending outwardly therefrom lengthwise of the strip, each of the outer legs of each body having a width equal to one-half the width of the center leg thereof and equal to the width of the base, the base of each body extending crosswise of the strip and terminating a distance from each edge thereof equal to slightly more than the width of the base, the legs of one of said bodies terminating a distance from the complementary legs of the other of said bodies equal to the width of the center legs of said bodies, the cutting of said bodies leaving a section extending crosswise of the strip and leaving extensions on said section from between the legs of said bodies, cutting said extensions and a central square portion from said section of the strip to leave opposed extensions on and crosswise of the strip to form an H-shaped opening in and across the strip, said opposed extensions having a width equal to the width of the center leg of said first pair of bodies, and then simultaneously cutting the strip at the opposite ends of the H-shaped opening to form a second pair of opposed and complementary E-shaped bodies having a base lengthwise of the strip and of the same size as the base of said first pair of bodies and legs of equal length crosswise of the strip and of the same width but longer than the legs of said first pair of bodies, the center leg of said second pair of bodies comprising the extensions of the H-shaped opening and the outer legs of said second pair of bodies extending along and being integral with the outer edges of said H-shaped opening, the cutting of said second pair of bodies leaving a narrow connecting strip along each of the outer edges of the strip.

2. The method of preparing transformer core pieces from a continuous strip which comprises the steps of, cutting a first pair of opposed complementary E-shaped bodies of predetermined size having a base and spaced legs of equal length extending outwardly therefrom lengthwise of the strip, each of the outer legs of each body having a width equal to one-half the width of the center leg thereof and equal to the width of the base, the base of each body extending crosswise of the strip and terminating a distance from each edge thereof equal to slightly more than the width of the base, the legs of one of said bodies terminating a distance from the complementary legs of the other of said bodies equal to the width of the center legs of said bodies, the cutting of said bodies leaving extensions on the strip from between the legs of said bodies, cutting said extensions to leave two rectangular openings extending crosswise of the strip spaced by a section of the strip having a width equal to the width of the center legs of said bodies, cutting a central square portion of and across said section of the strip to leave opposed extensions of equal length on and crosswise of the strip to form an H-shaped opening in the strip, and then simultaneously cutting the strip at the opposite ends of the H-shaped opening to form a second pair of opposed and complementary E-shaped bodies having a base lengthwise of the strip and of the same size as the base of said first pair of bodies and legs crosswise of the strip and of the same width but longer than the legs of said first pair of bodies, the center leg of said second pair of bodies comprising the extensions of the H-shaped opening and the outer legs of said second pair of bodies extending along and being integral with the outer edges of said H-shaped opening, the cutting of said second pair of bodies leaving a narrow connecting strip along each of the outer edges of the strip.

3. The method of preparing transformer core pieces from a continuous strip which comprises the steps of, cutting a first pair of opposed complementary E-shaped bodies of predetermined size having a base and spaced legs of equal length extending outwardly therefrom lengthwise of the strip, each of the outer legs of each body having a width equal to one-half the width of the center leg thereof and equal to the width of the base, the base of each body extending crosswise of the strip and terminating a distance from each edge thereof equal to slightly more than the width of the base, the legs of one of said bodies terminating a distance from the complementary legs of the other of said bodies equal to the width of the center legs of said bodies, the cutting of said bodies leaving extensions on the strip from between the legs of said bodies, cutting said extensions to leave two rectangular openings extending crosswise of the strip spaced by a section of the strip having a width equal to the width of the center legs of said bodies, cutting a central square portion of and across said section of the strip to leave opposed extensions of equal length on and crosswise of the strip to form an H-shaped opening in the strip, and then simultaneously cutting a second pair of opposed and complementary E-shaped bodies of predetermined size having a base equal in size to the base of said first pair of bodies and legs equal in width but longer than the legs of said first pair of bodies and extending crosswise of the strip, the center leg of said second pair of bodies being formed of said opposed extensions with the outer legs of said second pair of bodies extending along and being integral with the outer edges of said H-shaped opening and the base of said second pair of bodies extending across the ends of the legs of said H-shaped opening lengthwise of the strip with the outer edge of said bases terminating a slight distance inwardly from the outer edges of the strip to leave narrow connecting strips along the outer edges thereof.

4. The method of preparing transformer core pieces from a continuous strip which comprises the steps of, cutting a first E-shaped body of predetermined size having a base and spaced legs of equal length extending outwardly therefrom lengthwise of the strip, each of the outer legs having a width equal to one-half the width of the center leg and equal to the width of the base, the base extending crosswise of the strip and terminating a distance from each edge thereof equal to slightly more than the width of the base, cutting a second E-shaped body complementary to said first body but disposed in reverse direction with the legs thereof extending towards and aligned with the complementary legs of said first body and terminating a distance therefrom equal to the width of the center legs of said first and second bodies, the cutting of said first and second bodies leaving extensions on the strip from between the legs of said first and second bodies, cutting said extensions to leave two rectangular openings extending crosswise of the strip spaced by a section of the strip having a width equal to the width of the center legs of said first and second bodies, cutting a central square portion of and across said section of the strip to leave opposed extensions of equal length on and crosswise of the strip to form an H-shaped opening in the strip, and then simultaneously cutting a pair of opposed and complementary E-shaped bodies of predetermined size having a base equal in size to the base of said first and second bodies and legs equal in width but longer than the legs of said first and second bodies and extending crosswise of the strip, the center leg of said pair of bodies being formed of said opposed extensions and the outer legs extending along and being integral with the outer edges of said H-shaped opening and the base of said pair of bodies extending across the ends of said H-shaped opening lengthwise of the strip with the outer edge of said bases terminating a slight distance inwardly from the outer edges of the strip to leave narrow connecting strips along the outer edges thereof.

5. The method of preparing transformer core pieces from a continuous strip which comprises the steps of, cutting a first E-shaped body of predetermined size having a base and spaced legs of equal length extending outwardly therefrom lengthwise of the strip, each of the outer legs having a width equal to one-half the width of the center leg and equal to the width of the base, the base extending crosswise of the strip and terminating a distance from each edge thereof equal to slightly more than the width of the base, cutting a second E-shaped body complementary to said first body but disposed in reverse direction with the legs thereof extending towards and aligned with the complementary legs of said first body and terminating a distance therefrom equal to the width of the center legs of said first and second bodies, the cutting of said first and second bodies leaving extensions on the strip from between the legs of said first and second bodies, cutting said extensions to leave two rectangular openings extending crosswise of the strip spaced by a section of the strip having a width equal to the width of the center legs of said first and second bodies, cutting a central square portion of and across said section of the strip to leave opposed extensions of equal length on and crosswise of the strip to form an H-shaped opening in the strip, and then simultaneously cutting the strip at the opposite ends of the H-shaped opening to form a pair of opposed and complementary E-shaped bodies having a base lengthwise of the strip and of the same size as the base of said first and second bodies and legs crosswise of the strip and of the same width but longer than the legs of said first and second bodies, the center legs of said pair of bodies comprising the extensions of the H-shaped opening and the outer legs of said pair of bodies extending along and being integral with the outer edges of the H-shaped opening, the cutting of said pair of bodies leaving a narrow connecting strip along each of the outer edges of the strip.

No references cited.

ANDREW R. JUHASZ, *Primary Examiner.*